Dec. 2, 1952 J. VAN H. WHIPPLE ET AL 2,620,187
ELEVATING MECHANISM FOR BOWLING ALLEY PITS
Filed May 15, 1947 9 Sheets-Sheet 1

Inventors:
Jack Van Horn Whipple
George P. Bentley
Edward P. Bentley
By:
their Attorney.

Dec. 2, 1952 J. VAN H. WHIPPLE ET AL 2,620,187
ELEVATING MECHANISM FOR BOWLING ALLEY PITS
Filed May 15, 1947 9 Sheets-Sheet 2

Inventors:
Jack Van Horn Whipple
George P. Bentley
Edward P. Bentley
By:
their Attorney

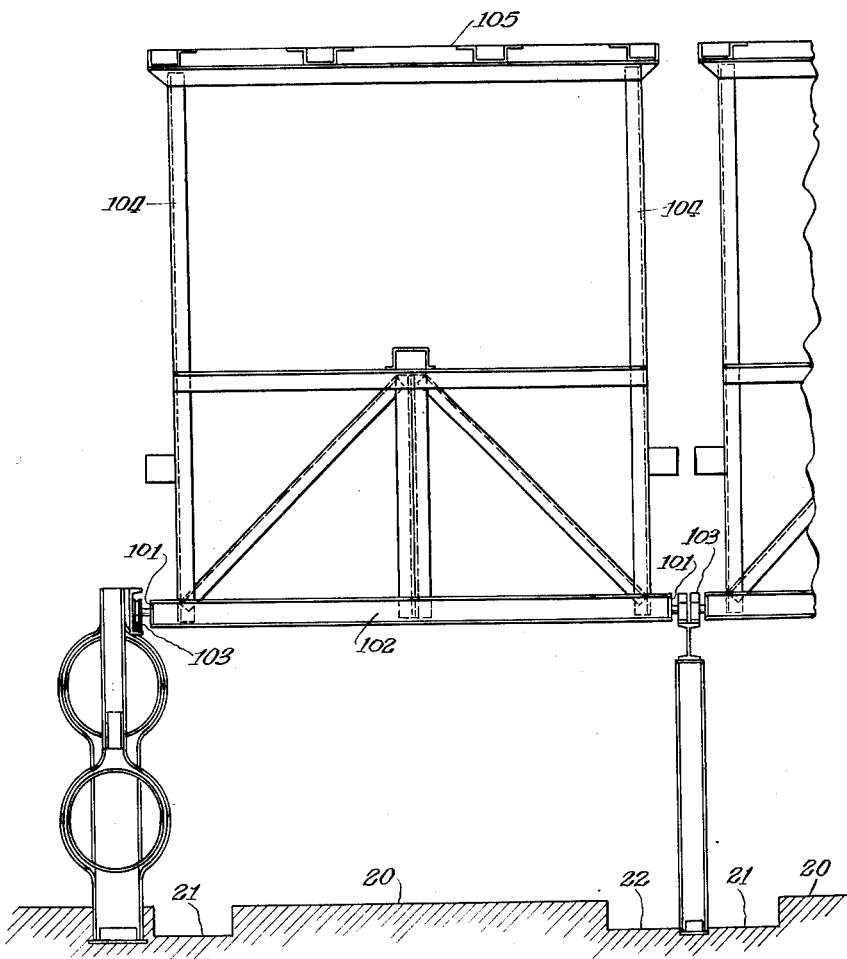
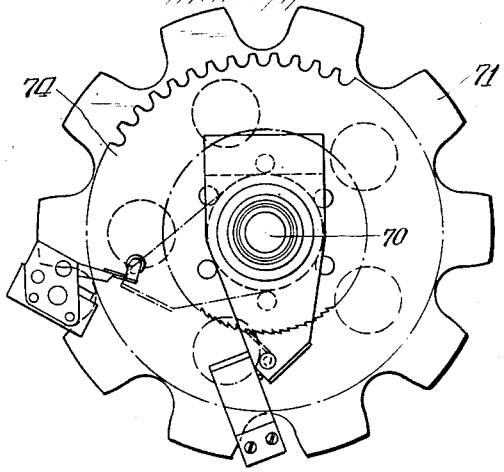

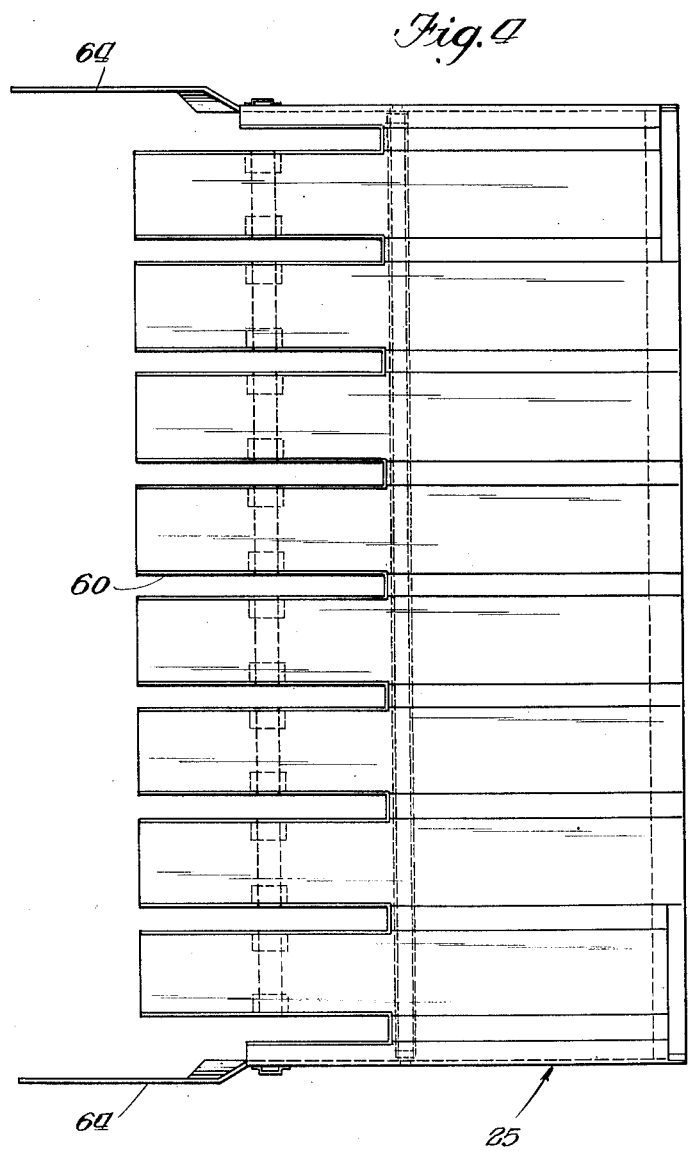

Dec. 2, 1952  J. VAN H. WHIPPLE ET AL  2,620,187
ELEVATING MECHANISM FOR BOWLING ALLEY PITS
Filed May 15, 1947  9 Sheets-Sheet 5

Inventors:
Jack Van Horn Whipple
George P. Bentley
Edward P. Bentley
By: their Attorney

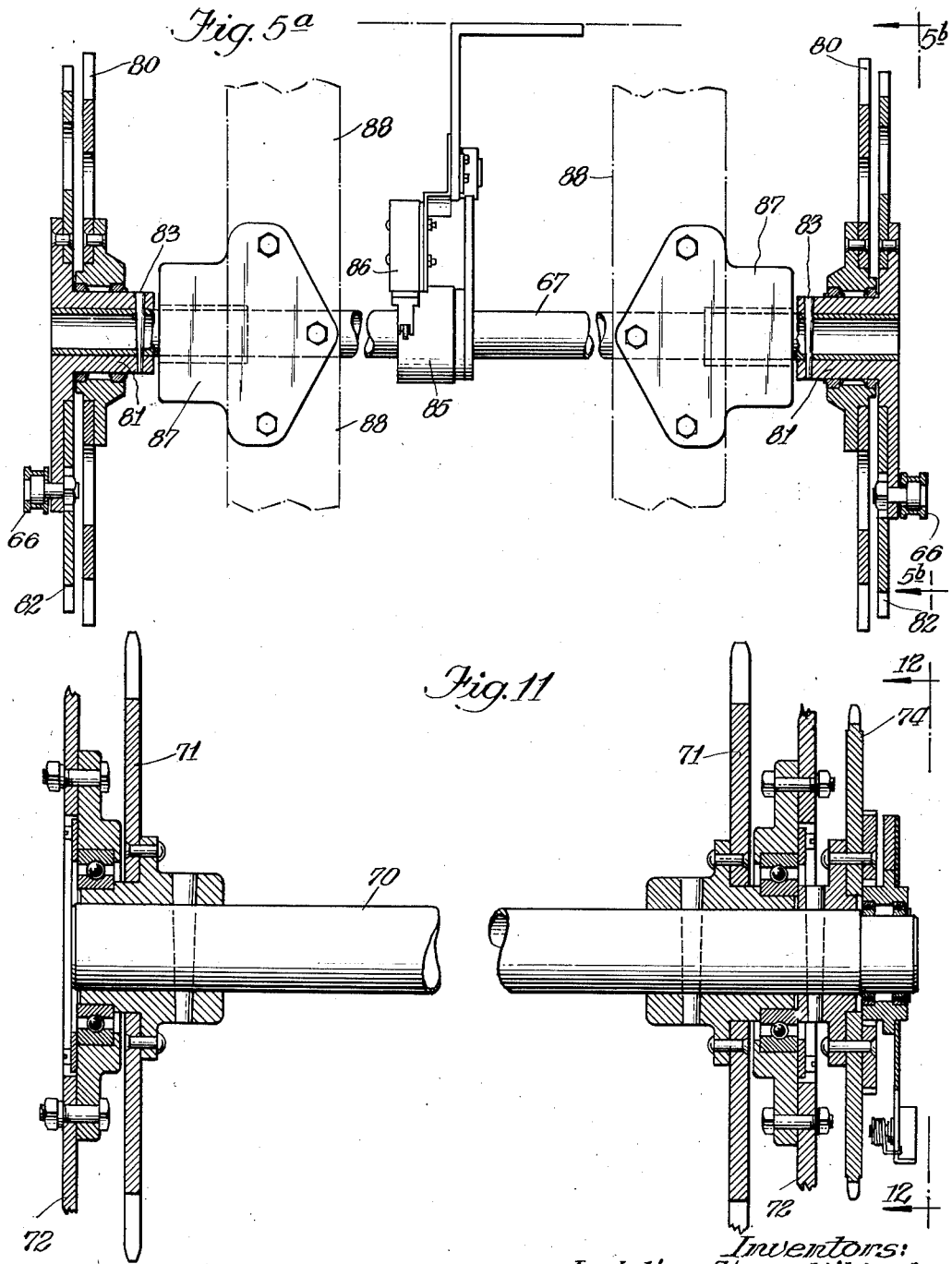

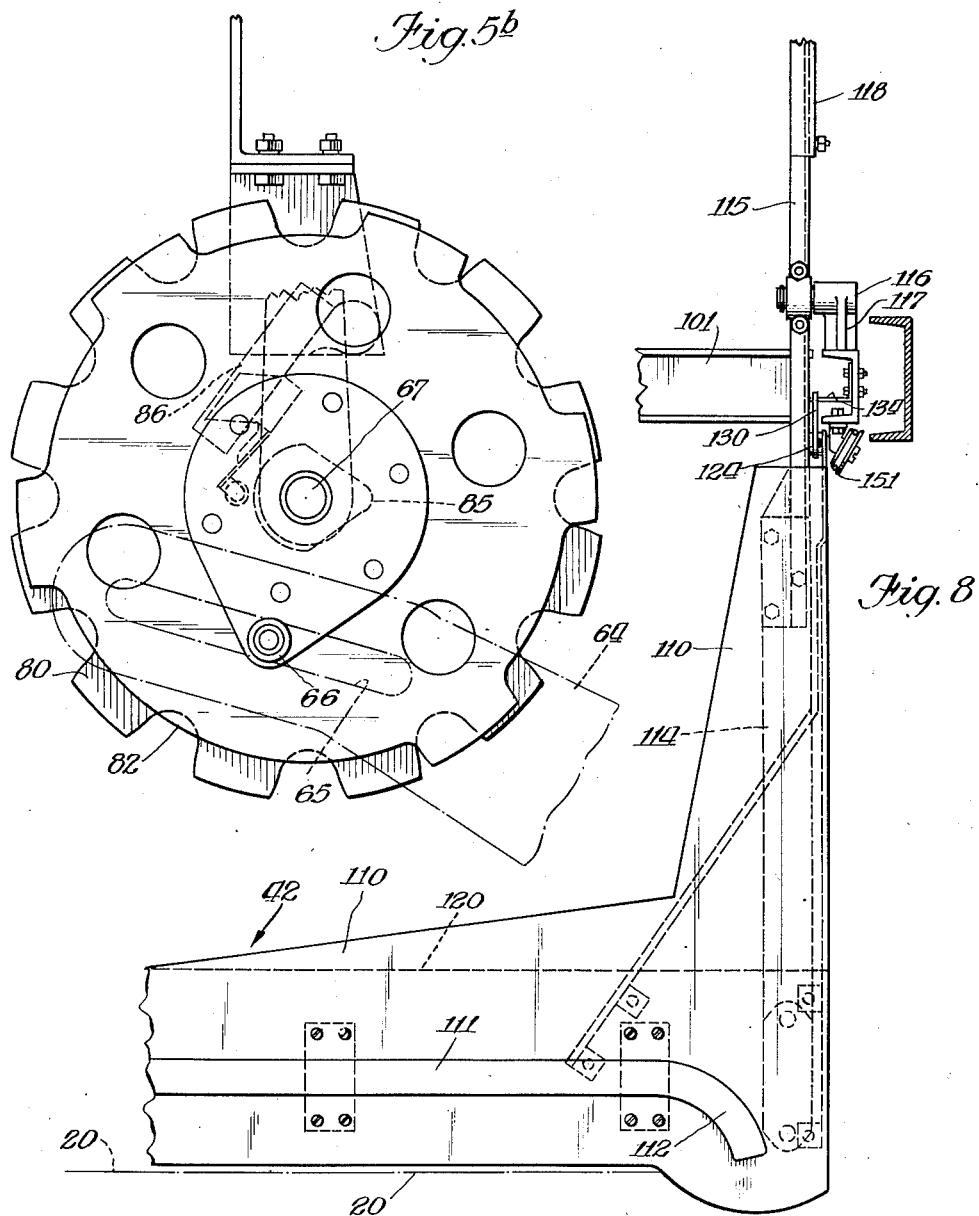

Dec. 2, 1952 — J. VAN H. WHIPPLE ET AL — 2,620,187
ELEVATING MECHANISM FOR BOWLING ALLEY PITS
Filed May 15, 1947 — 9 Sheets-Sheet 8

Inventors:
Jack Van Horn Whipple
George P. Bentley
Edward P. Bentley
By: [signature]
their Attorney

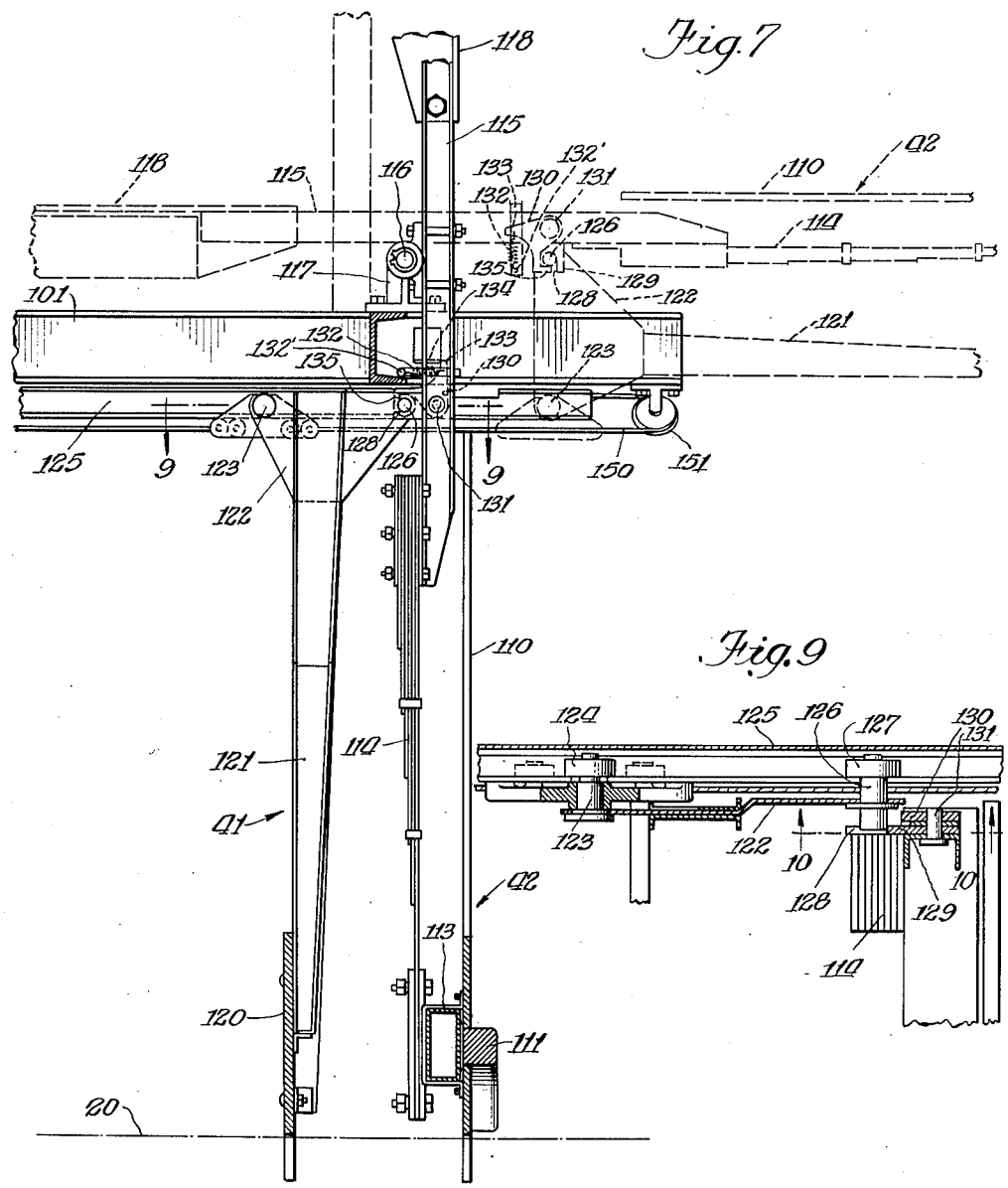
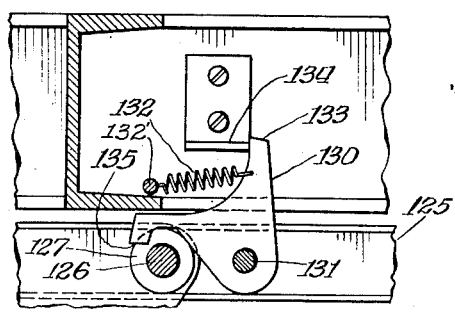

Patented Dec. 2, 1952

2,620,187

UNITED STATES PATENT OFFICE 2,620,187

ELEVATING MECHANISM FOR BOWLING ALLEY PITS

Jack Van Horn Whipple, New York, George P. Bentley, Garden City, and Edward P. Bentley, New York, N. Y., assignors to The Brunswick-Balke-Collender Company, Chicago, Ill., a corporation of Delaware Application May 15, 1947, Serial No. 748,159

4 Claims. (Cl. 273—43)

1

The invention relates to a pin-setting machine wherein the handling of the pins and balls is accomplished by mechanical apparatus instead of a pin boy.

It is the general object to provide a new and improved elevating mechanism for the pit of a bowling alley.

Additional objects are to provide novel elevating mechanisms positioned in and extending upwardly from the pit of a bowling alley, said mechanisms including a plurality of elevator flights for carrying playing objects to be elevated, as balls and pins, said flights passing in front of the pit cushion in the pit; to provide an elevating mechanism for raising playing objects from the pit of a bowling alley having means for discharging playing objects from said flights comprising means for tilting said flights; and to provide a guide channel associated with each chain of the elevating mechanism for causing each flight to pass in front of the pit cushion and for tilting the flights near the top of their upward run.

Other objects will become readily apparent in the following detailed description taken in connection with the accompanying drawings wherein:

Fig. 3 is a front elevational section approximately along the line 3—3 of Fig. 2.

Fig. 4 is an enlarged fragmentary plan view of the apparatus on the floor of the pit along the line 4—4 of Fig. 2.

Fig. 5a is a substantially vertical transverse section along the line 5a—5a of Fig. 5.

Fig. 5b is a fragmentary view along the line 5b—5b of Fig. 5a.

Fig. 7 is an enlarged fragmentary side elevation, partly in section, of the sweep device.

Fig. 8 is a fragmentary front elevation of the sweep device and bumper board.

Fig. 9 is a fragmentary horizontal section along the line 9—9 of Fig. 7.

Fig. 10 is a fragmentary section along the line 10—10 of Fig. 9.

Fig. 11 is a vertical section along the line 11—11 of Fig. 5.

Fig. 12 is a reduced section along the line 12—12 of Fig. 11.

2

Figure 1:
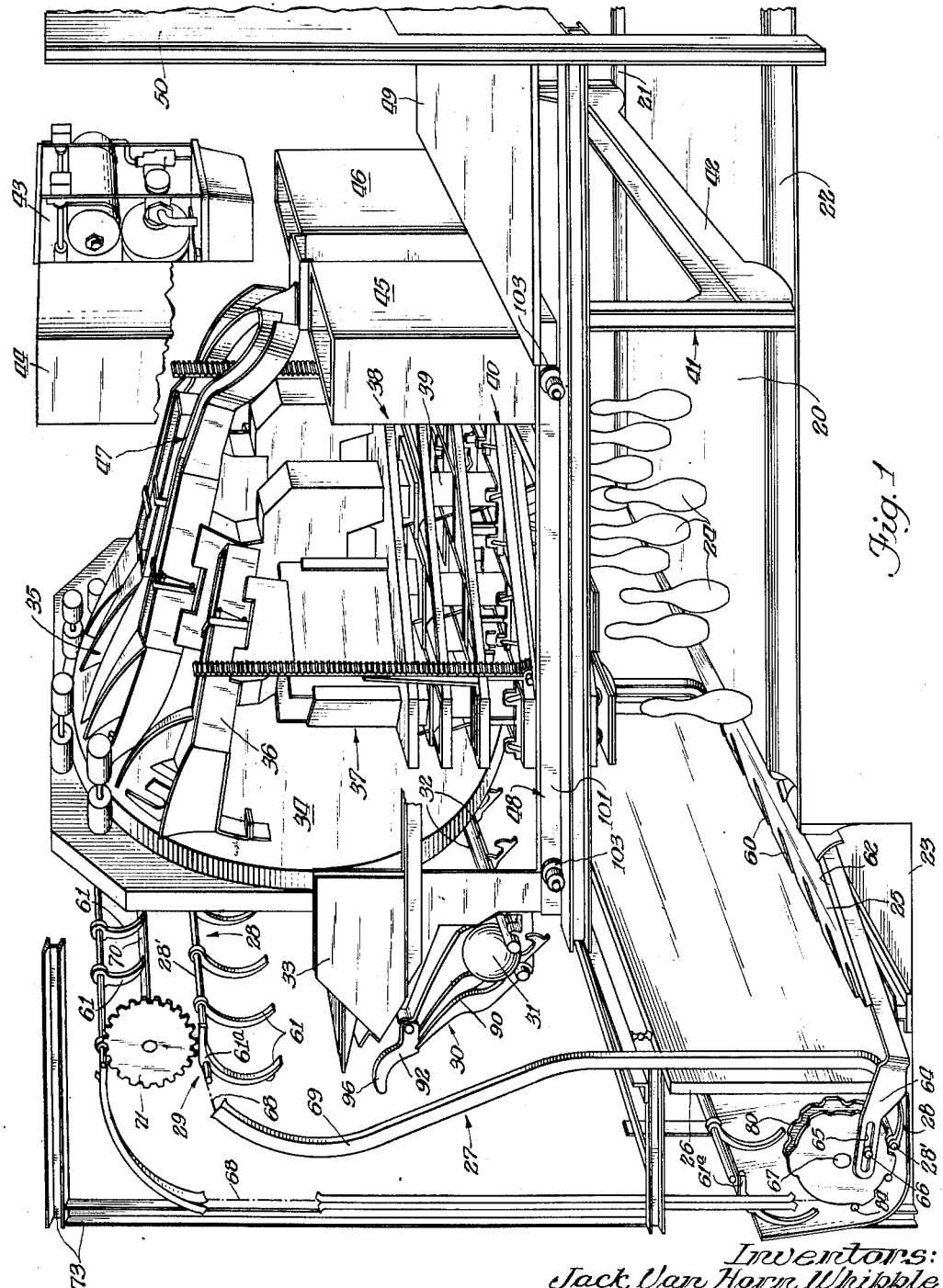
Fig. 1 is a fragmentary perspective view of a bowling pinsetting machine embodying a preferred form of the invention.

While we have illustrated in the drawings and shall herein describe in detail a preferred form of the invention, it is to be understood that the invention is not limited to the particular arrangement shown, it being contemplated that various changes may be made by those skilled in the art without parting from the spirit and scope of the invention as expressed in the appended claims.

Figure 2:
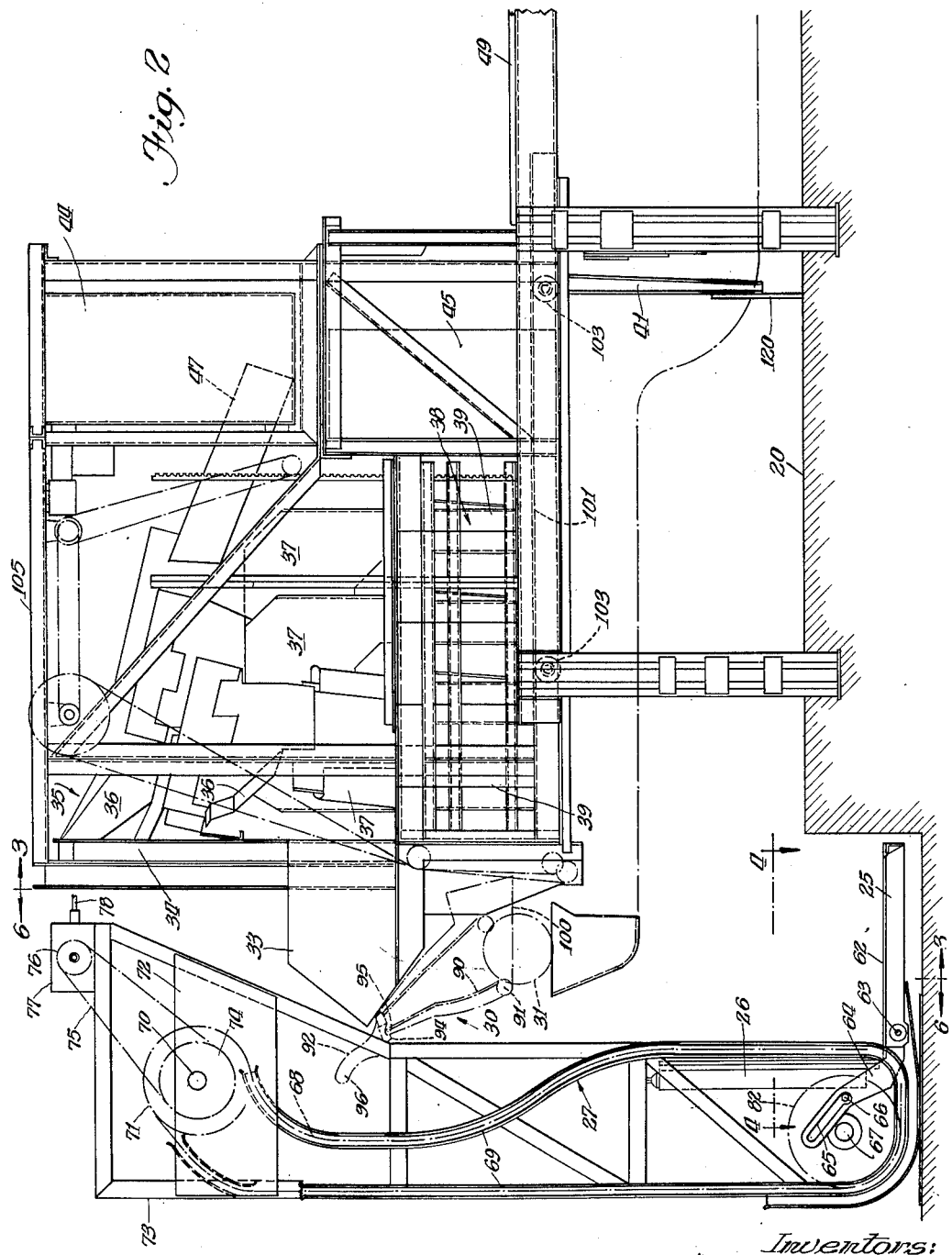
Fig. 2 is a fragmentary side elevational view thereof.

As illustrated in the drawings, and with particular reference to Figs. 1 to 3, the preferred form of the invention is installed at the rear end of a bowling alley 20 equipped with the customary gutters 21 and 22 and pit 23. Pins 24 are arranged to be placed on the alley in the standard triangular formation of ten.

Generally, the machine comprises a tiltable tray 25 normally forming the bottom or floor of the pit 23 and inclinable to urge the pins and ball in the pit towards the rear against a pit cushion 26; a pin and ball elevating conveyor 27 having a plurality of pin and ball carrying flights 28 movable upwardly from the pit to a discharge position for the pins at 29; a ball transfer means 30 arranged to remove a ball 31 from the conveyor and transfer it to ball return tracks 32; a pin chute 33 for receiving pins discharged by the conveyor flights at 29; a rotary drum-like pin sorter 34 into which the pins pass from the chute 33 and are carried upwardly for discharge into a distributor 35 comprising a plurality of chutes 36; a magazine 37 adapted to receive and hold a set of pins prior to their movement into a pinsetter 38 having ten vertically positioned and triangularly arranged pin tubes 39; a pin pickup mechanism 40 for elevating standing pins from the alley during a sweeping operation to remove dead wood therefrom, a sweep device 41 for sweeping the alley and gutters clear, a guard device 42 (Figs. 7 and 8) for stopping a ball thrown during certain operations of the machine, power operating mechanism including a power unit 43 and control mechanism housed partly in a unit 44. Shown also in Fig. 1 is a means for changing the pins in the machine by withdrawing the set that is in use and feeding into the machine an alternate set. This means includes pin containers or boxes 45 and 46, positioned generally under the parts 43 and 44 and a pin diversion chute structure 47 for diverting pins from the distributor 35 into one or the other of the boxes 45 and 46.

Preferably, as hereinafter more fully disclosed, the parts 30 to 47 inclusive, are all supported on a carriage 48 which is movable from the normal rear position shown in Fig. 1 wherein the pin chutes 39 are over the respective pin spots on the alley 20 to a forward position approximately three feet ahead of the position shown in order to permit manual setting of pins on the alley by a pin boy. A walk 49 extending across the alley and any other alleys on which similar machines are installed to facilitate initial loading of pins into the machines or pin boxes and servicing of the power and control units may be swung upwardly to a vertical position when the carriage 48 is to be moved forwardly. Generally, a masking unit or board 50 is located in front of the machine and at a suitable distance above the alley bed so as to shield the machine from the approach end of the alley. If desired, this masking unit may be equipped with signal lights arranged in a triangular formation similar to that of the pins on the alley and suitably connected to be illuminated when pins are standing.

The various machine parts will be described approximately in the sequence in which they operate after a ball has been rolled down the alley by a player. Thus, upon such a rolling of the ball, the ball and usually some of the pins enter the pit 23 and rest upon the tray 25 in its lower or horizontal position. At such time the pin and ball elevator 27 is stopped in a position in which two of the flights 28 are below and behind the pit cushion 26 and the other two of the flights are above the top of the pit cushion so that it is impossible for the pins or ball to strike the elevator flights. The tray 25, as illustrated in Figs. 1, 2, 4 and 5 is in the form of a metal framework having a plurality of slots 60 (Fig. 4) in the rear edge thereof to accommodate the passage of forks or tines 61 on the conveyor flights. Preferably, the tray is covered with a layer 62 of a cushioning and sound deadening material such as rubber or felt. The tray is pivoted adjacent its rear edge on a cross shaft 63 so that it may be moved from a lower horizontal position (which it assumes during actual bowling by a player) to the inclined or upper position illustrated in Figs. 1 and 5, into which it is moved after a ball has been rolled. To swing the tray between its two positions, arms 64 extend rearwardly from the opposite side edges thereof and are slotted at 65 to admit a crank pin 66 carried on a cross shaft 67. The movements of the tray are synchronized with certain movements of the pin and ball conveyor as hereinafter more fully described.

The pin and ball elevator 27 comprises a pair of roller chains 68, one at each side of the pit 23 and each constrained to follow a special curved path by guide channels 69. As shown best in Fig. 5, each guide channel has a rear portion through which the chain normally moves downwardly, a bottom portion through which the chain normally moves forwardly, and a forward portion through which the chain normally moves upwardly. The roller chains carry four tine assemblies or rakes which extend between the chains and consist of rods 28' rotatably carried on the chains and tines 61 non-rotatably carried on the rods. The outer or end tines of each group carry an angular extension 61a which engages the walls of the forward run of the guide channel 69 so that the tines of each flight extend perpendicularly to said guide channel and forwardly thereof on their upward run. As each flight of tines approaches the end of the run, the extensions 61a on the end tines are disengaged from the guide channel as shown in Fig. 1, so that the tines may pivot to an inoperative position as they move around the sprockets at the ends of the upward and downward runs and may hang substantially vertically during the downward run. The elevator flights or rakes are normally driven up through the slots 60 in the tray 25 to pick up pins and balls from below. Generally, a ball is picked up on the first flight of the conveyor passing upwardly from the tray and if not on the first flight, then almost invariably on the second. As soon as the first flight passes through the pins on the tray, the majority of the pins are arranged crosswise of the alley and those which are not carried upwardly on the first flight are picked up on the second flight. The widely spaced tines effectively produce a "stringing out" or "debunching" of the pins, as only a limited number can get on one set of tines at one time. This avoids jamming of pins in the pin chute 33 when they are discharged from the elevator.

The chains 68 are driven from an upper cross shaft 70 (Figs. 1, 2, 5 and 11) which carries a sprocket 71 at each end thereof. The shaft 70 is rotatably supported from side plates 72 on the frame 73 for the elevator and carries a sprocket 74 which is connected by means of a chain 75 to a sprocket 76 on a bevel gear device 77 which has an input shaft 78. Preferably, the shaft 78 is driven by a reversible hydraulic or electric motor or other power means (not shown), the operation of which may be controlled automatically to give the pin and ball conveyor the desired movements hereinafter described.

Figure 5:
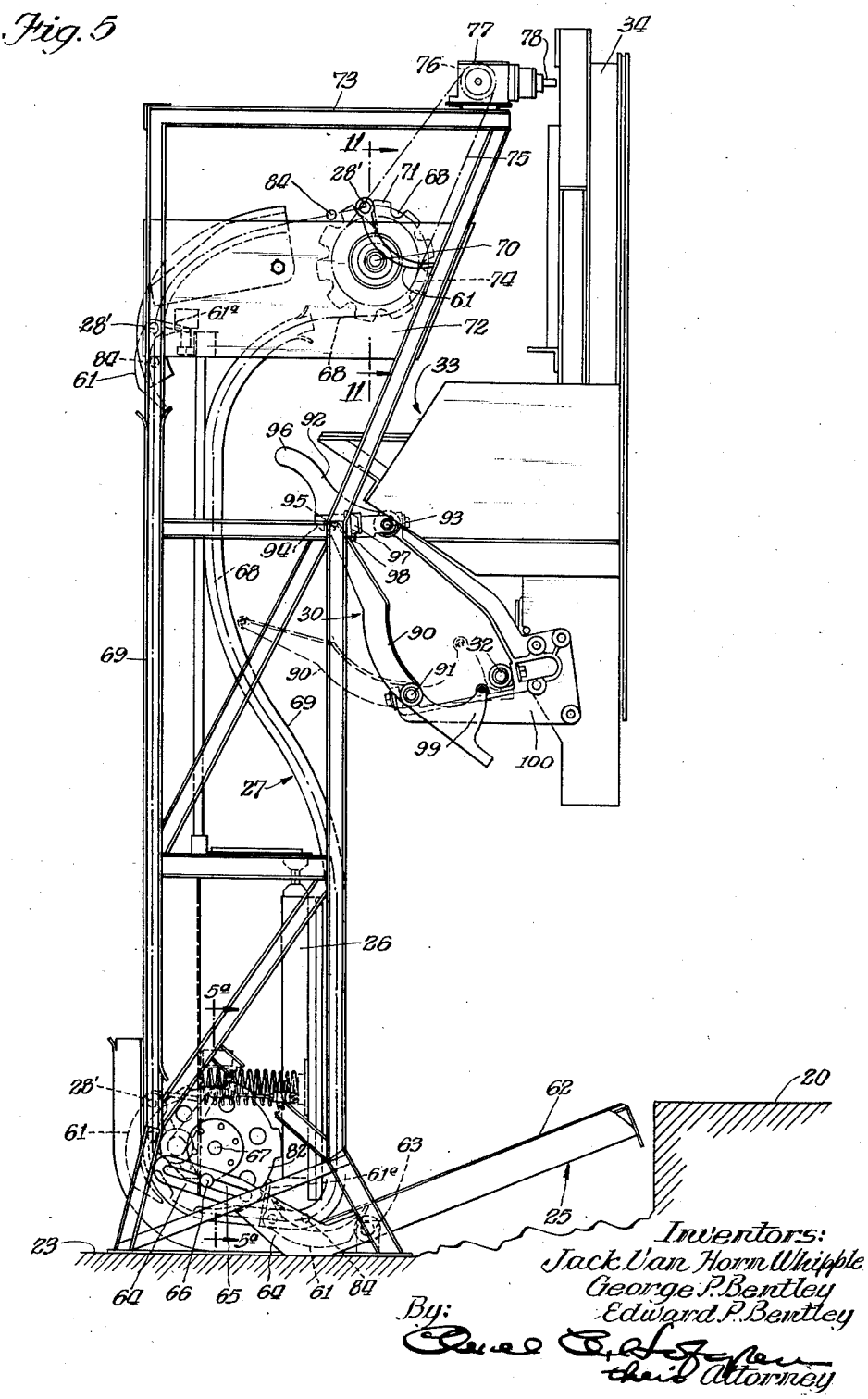
Fig. 5 is an enlarged fragmentary side elevation of the pin and ball elevator.
Figure 6:
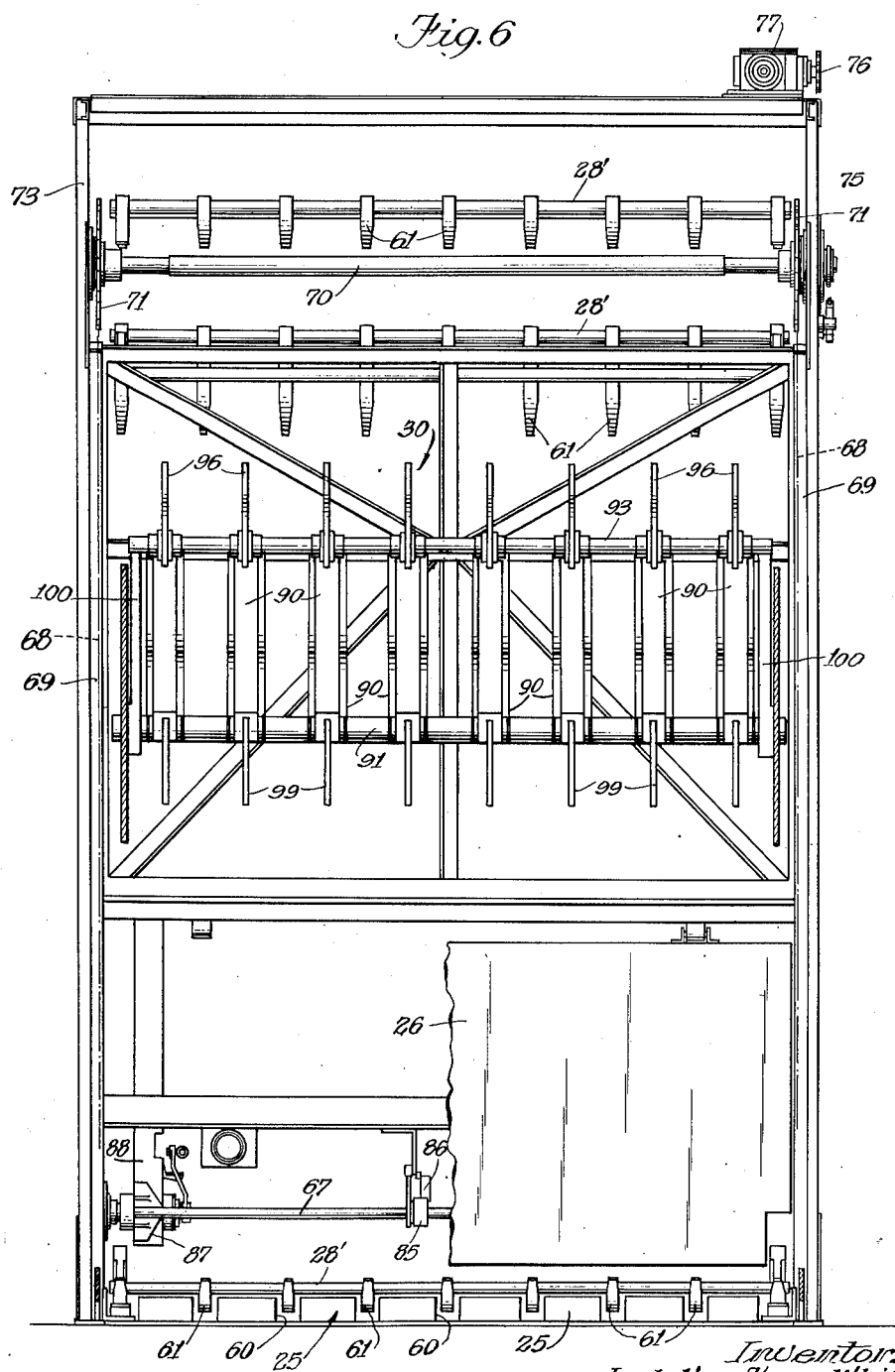
Fig. 6 is a section approximately along the line 6—6 of Fig. 2.

At the lower end of their runs the conveyor chains 68 pass over idler sprockets 80 which are rotatably mounted on the shaft 67. As best illustrated in Fig. 5a the sprockets 80 are rotatably mounted on the hubs 81 of a pair of sprockets 82, the sprockets 82 being fixed on the shaft 67 by pins 83. The pins 66 for operating the tray 25, shown as flanged rollers in Fig. 5a, are carried on the sprockets 82 so that the tray 25 is actuated when the sprockets 82 and shaft 67 are rotated. In the form of the invention herein disclosed, the sprockets 82 are arranged to be actuated intermittently in a counterclockwise direction only as viewed in Fig. 5, by auxiliary rollers 84 (Figs. 1 and 5) carried on the outside of the conveyor chains 68 at a proper phase relation relative to the conveyor flights. This arrangement permits the chains to pick up sprockets 82, turn them a complete revolution, and then drop them. This action takes place once in each complete chain cycle and acts to lower the pit floor (tray 25) during the first part of the sprocket rotation and to raise the pit floor during the last part of the sprocket rotation. At the point of rotation of the sprockets 82 where the pit floor is down, a cam 85 on the shaft 67 operates a switch 86 which may be connected in a circuit arranged to stop the conveyor chains and hold the pit floor in its lowered position which is the condition for bowling. The shaft 67 is rotatably mounted in blocks 87 supported on bracket portions 88 of the elevator frame 73.

Ball transfer mechanism

The ball transfer mechanism indicated generally at 30 in Figs. 1, 2 and 5 is arranged to be operated by a ball traveling upwardly on any of the flights of the conveyor and to transfer the ball from the conveyor to the return rails 32. As illustrated, the transfer mechanism comprises a plurality of ball runways in the form of pairs of levers 99 pivotally mounted on a transversely extending shaft 91 supported on the pin chute 33 by brackets 100. The levers 99 are normally in an upper withdrawn position as shown in Fig. 5 and are held in such position by latch devices 92 pivotally mounted on a cross shaft 93. Notched portions 94 of the latch devices interengage with the free ends 95 of the levers 90 to hold them in their upper position. The latch devices 92 have rearwardly and upwardly extending arms 96 projecting into the path of a ball traveling upwardly on a flight of the conveyor. As it is possible that a ball may be located between any two adjacent tines 61 of a conveyor flight, one pair of ball runway levers 90 and one latch device 92 is provided for each space between adjacent tines on the conveyor flights and each pair of levers 90 and latch device 92 is operable independently of each other pair of levers and latch device. As a ball moves upwardly on the conveyor and engages an arm 96 it pivots the latch device upwardly and releases the associated pair of levers 90 which levers 90 then drop to their lower position shown in dashed lines in Fig. 5 wherein they underlie the ball on the conveyor. Operation of the latch device also causes the actuation of a switch device 97 which is carried on the latch device and has a separate arm 98 engaging one of the associated levers 90 when they are in latched position. Preferably, the switch device 97 is connected into a control circuit (not shown) arranged to cause a reversal of the conveyor 27 so that the flight on which the ball is carried descends a distance of approximately fifteen inches, whereupon the ball is lifted from the tines of the conveyor flight and rolls down the runway levers 90 towards the rails 32. As the ball passes over the shaft 91 it engages an upwardly projecting portion 99 connected to the levers 90 and the weight of the ball causes the levers 90 to pivot in a clockwise direction back to latched position. This movement of the levers deposits the ball on the rails 32 and permits it to return to the bowler. In the meantime, actuation of the switch device 97 by the relatching of the levers 90 is preferably utilized to cause the conveyor to move the forward flights upwardly again so that as they pass through the pin discharge position 29 any pins on the conveyor flights are discharged into the pin chute 33.

*Shiftable carriage parts*

As mentioned hereinabove, the parts of the machine numbered generally from 30 to 47 are carried on a shiftable carriage 48. This carriage consists of a framework seen best in Figs. 1, 2 and 3 which includes a bottom frame having side members 101, end members 102 and rollers 103 carried on each side member adjacent each end thereof to form a four point support. The carriage includes upwardly extending frame members 104 and a top frame 105 and the entire carriage, as heretofore mentioned, is movable from its normal rear position as shown in Figs. 1 and 2 to a forward position approximately three feet ahead of the rear position. As the particular construction of the parts 34 to 40 is disclosed in detail and claimed in other applications referred to hereinafter in this paragraph, no detailed description thereof will be made here. Suffice it to say that the drum sorter 34 is arranged to rotate and that during its rotation, pins pass thereinto from the pin chute 33, are carried in a circular path upwardly and discharged into the chutes 36 of the distributor 35 from whence they pass downwardly, as disclosed more fully in an application of Jack Van Horn Whipple and Albert L. Odmark, Serial No. 736,682, filed March 24, 1947, into the magazine 37. The construction and operation of the diverting chutes 47 and pin boxes 45 and 46 are more fully disclosed and claimed in a copending application of George A. Montooth, Serial No. 752,898, filed June 6, 1947.

*Sweep device and guard*

In addition to the sweep device 41 (Figs. 1, 2, 7, 8, 9 and 10) for sweeping fallen pins (and at times standing pins) into the pit, the invention provides a guard mechanism 42 hereinbefore referred to. The sweep device and guard mechanism are normally in raised positions wherein they extend horizontally as shown in dashed lines in Fig. 7 and after each ball has been rolled, the sweep device 41 and guard 42 are dropped to the vertical position shown in full lines in Fig. 7. The guard 42 then remains in said vertical position while the sweep device 41 is moved toward the left in Figs. 2 and 7 to the rear end of the alley to sweep pins therefrom.

As illustrated herein, the guard mechanism 42 comprises a somewhat U-shaped guard plate 110 carrying a cushion 111 extending transversely of the alley adjacent the lower portion thereof and provided with ends 112 which curve downwardly on the portions of the plate overlying the gutters. A tubular member 113 is secured to the plate 110 behind the cushion 111 to reinforce the plate. The plate is supported by a pair of leaf springs 114 which, at their lower ends, are secured to the tubular member 113 and at their upper ends are secured to channel members 115 which form levers pivotally supported on stub shafts 116. These shafts are supported in brackets 117 on the carriage bottom frame. Preferably, counterweights 118 are provided on the upper ends of levers 115 to balance the weight of the guard plate and the supports therefor below the axis of shafts 116.

The sweep device comprises a bar 120 which extends transversely across the alley just above the surface thereof when the sweep device is in its lowered position as shown in Fig. 7, and a pair of vertically extending arms 121 preferably in the form of channels or tubular members which are secured at their lower ends to the bar 120 and have their upper ends welded to plates 122. The plates 122 have pins 123 extending horizontally therefrom to carry rollers 124 which operate on tracks 125 carried on the bottom frame 101 of the carriage 48. Adjacent their front ends the plates 122 have pins 126 extending therefrom to carry rollers 127 also operating on the tracks 125. The pins 126, as shown most clearly in Fig. 9, project inwardly from the tracks 125 a short distance to engage in slots 128 formed in plates 129 secured to the adjacent portions of the bumper guard structure. Thus, with the parts as shown in Fig. 7, movement of the sweep device towards the right for the purpose of raising the sweep device causes the sweep device to swing upwardly because of the engagement of pins 126 in slots 128 because the guard plate pivots upwardly about the shafts 116. A latch member 130 is pivotally mounted on the guard channel member 115 by means of a pin 131 and is urged to move in a counterclockwise direction by a spring 132 anchored on a pin 132' extending from channel 115. When the guard plate is in the lower position shown in full lines an end 133 on the latch device engages an abutment 134 on the carriage bottom frame so as to move the latching end 135 of the latch out of interlocking engagement with a pin 126. This releases the sweep device for independent movement toward the left (Fig. 7) from the guard mechanism. When the sweep device is moved toward the right from the position in Fig. 7 and swings upwardly with the guard, the latch 130 is released from the abutment 134 and interengages with the pin 126 and remains in such engagement during the movements of the sweep device and guard mechanism upwardly to the dashed line position of Fig. 7.

In operating our improved machine, as a bowling ball 31 is rolled down the alley bed 20, it causes the machine to commence a cycle of operation by any conventional means, as for example a photocell detector unit (not shown) which may be located along the side of the bowling alley near the rear end thereof. Actuation of the photocell detector unit as the ball breaks a light beam associated with said unit causes the machine to begin a cycle of operation and the sweep device and the ball and pin conveyor start operation, these mechanisms being driven by hydraulic, electric, or other means.

As the conveyor chains 68 move, the auxiliary rollers 84 carried by said chains operate the sprockets 82 to tilt the tray 25 to the position of Figs. 1 and 5, so that the ball and pins resting on the said tray roll toward the back of the pit 23 where they may be picked up by the tines 61. As the ball is carried upward on the tines it strikes one of the extended latch arms 96 so that the ball transfer mechanism is actuated in the manner heretofore described, the conveyor chains reversing their direction for a distance of approximately fifteen inches to deposit the ball on the corresponding runway levers 90. As the conveyor again moves forwardly pins are carried upwardly from the pit and deposited in the pin chute 33 from which they are delivered to the pin sorter 34 and ultimately placed in the magazine 37 ready to be reset on the alley bed.

As the machine begins its cycle of operation, the sweep and guard mechanisms are also brought into operation. This operation is achieved by force exerted through a cable 150 which is secured to a bracket on the plate 122 and is supported on a reeving pulley 151 carried at the end of the side frame member 101, and which controls the sweep and guard apparatus. Tension on the lower run of this cable causes the entire sweep and guard assembly to pivot downwards, the locking action of the latch 133 previously described causing the guard mechanism to be moved downward with the sweep. As the mechanism reaches the dwell position on the alley bed, latch 130 is automatically released so that continued tension on the cable 150 in the same direction pulls the sweep backward along the alley bed toward the pit while guard 42 remains across the alley ahead of the pin spots thereon. On the reverse sweep stroke the upper run of cable 150 is pulled and the sweep is brought back into contact with the guard mechanism, the latch 130 becoming engaged as the guard moves away from the stop 134. Continued tension on the cable 150 causes the entire sweep and guard apparatus to pivot upwardly to the out of the way position shown fragmentarily in dashed lines in Fig. 7.

As the sweep starts to move from its upper or out of the way position down to its dwell position, the pinsetting and pickup apparatus 38 and 40 perform whatever operations are necessary depending upon whether the first ball or the second ball of the frame has just been rolled, and upon whether a strike or a spare has resulted from the rolling of said ball. Since the operation of this pinsetting and pickup mechanism is described in detail in our copending application for "Pin Setting Apparatus for Bowling Machines," filed July 8, 1947, as Serial No. 759,488, its operation will not be described further here.

After the alley has been swept clear, the machine completes its operation, the pickup mechanism returning to the alley bed standing pins which were picked up, or the pinsetting mechanism placing a complete set of pins on the alley bed according to the requirements of the cycle of the machine, and when the sweep mechanism has been pivoted upward to its stowed position, the machine is ready for the next ball to be rolled.

The operation of the pin changing mechanism 45, 46 and the walk 49 which extends transversely across the alley will not be described in detail here, since such apparatus is completely disclosed and claimed in the copending application of George A. Montooth, filed June 6, 1947, as Serial No. 752,898.

In the event it is desired to set pins on the alley manually, it is merely necessary to swing the walk 49 to its out of the way position and to move carriage 48 forwardly from its normal rear position. Since the carriage supports the ball transfer apparatus 39, the pin handling apparatus comprising the pin chute 33, the sorter 34, the distributor 35 and the magazine 37, the pinsetting and pickup mechanisms 38 and 40, and the sweep and guard mechanisms 41 and 42, the space above the rear portion of the alley bed will now be free from all parts of the apparatus so that a pin boy may set pins. The apparatus for moving the carriage may comprise a crank mechanism of the type disclosed in the copending application of Jack Van Horn Whipple and Albert L. Odmark for a Pin Setting Machine, filed March 24, 1947, as Serial No. 736,682.

We claim:

1. Pin elevating mechanism for raising playing objects from the pit of a bowling alley having a pit cushion, comprising in combination, a lower shaft extending crosswise of the pit behind the pit cushion and having sprockets at the opposite ends thereof, an upper shaft extending crosswise of the pit at a level above the pit cushion and having sprockets at the opposite ends thereof, a chain at each side of the pit connecting said sprockets and having the rear and downwardly movable run thereof extending behind the pit cushion, a plurality of elevator flights supported between said chains on a limited length thereof so that the flights are out of the pit and away from the front of the pit cushion when the mechanism is stopped, a vertically extending guide channel associated with each chain for guiding said flights in front of the pit cushion, said guide channels being curved forwardly toward the horizontal adjacent their upper ends to tilt the flights and discharge objects therefrom, means for driving one of said cross shafts to actuate the elevating mechanism, means for stopping said driving means after each cycle of operation of the elevating mechanism in a position wherein the flights are out of the pit and away from the front of the pit cushion.

2. Apparatus of the character claimed in claim 1, wherein each elevator flight comprises a cross bar having a plurality of tines nonrotatably mounted thereon.

3. Apparatus of the character claimed in claim 1, wherein each elevator flight comprises a cross bar having a plurality of tines mounted thereon and there are means for holding the flights in position to carry playing objects comprising a member on each end of each elevator flight adapted to engage the respective guide channels adjacent the lower end thereof near the beginning of the upward run of each flight and adapted to be disengaged from said channels adjacent the upper end thereof near the end of the upward run of each flight.

4. Pin elevating mechanism for raising playing objects from the pit of a bowling alley having a pit cushion, comprising in combination, a lower shaft extending crosswise of the pit behind the pit cushion and having sprockets at the opposite ends thereof, an upper shaft extending crosswise of the pit at a level above the pit cushion and having sprockets at the opposite ends thereof, a chain at each side of the pit connecting said sprockets, a plurality of elevator flights supported between said chains on a limited length thereof so that the flights may be positioned entirely out of the pit and away from in front of the pit cushion when the mechanism is stopped, each flight comprising a crossbar having a plurality of tines nonrotatably mounted thereon, any two of which tines can carry a pin, a vertically extending guide channel associated with the upwardly movable run of each chain and forwardly of the pit cushion, said guide channels being curved towards the horizontal adjacent their upper ends to tilt the tines and discharge pins therefrom, a member on each end of each elevator flight adapted to engage the respective guide channels adjacent the lower end thereof near the beginning of the upward run of each flight for causing the tines to project perpendicularly to the guide channels when passing upwardly, said members being adapted to be disengaged from said channels adjacent the upper end thereof near the end of the upward run of each flight for permitting the tines to hang substantially vertically when passing downwardly, means for driving the upper cross shaft to actuate the elevating mechanism, and means for stopping said driving means after each cycle of the elevating mechanism in a position wherein the tines are out of the pit and away from the front of the pit cushion.

JACK VAN HORN WHIPPLE.
GEORGE P. BENTLEY.
EDWARD P. BENTLEY.

REFERENCES CITED

The following references are of record in the file of this patent:

UNITED STATES PATENTS

| Number | Name | Date |
|---|---|---|
| 1,203,216 | McFarland | Oct. 31, 1916 |
| 1,542,804 | Gray | June 16, 1925 |
| 1,557,177 | Lorenz et al. | Oct. 13, 1925 |
| 1,586,831 | Murphy | June 1, 1926 |
| 1,627,414 | Schaffer | May 3, 1927 |
| 1,692,796 | Bishop | Nov. 20, 1928 |
| 1,712,186 | White | May 7, 1929 |
| 2,242,069 | Heininger | May 13, 1941 |
| 2,250,503 | Rundell | July 29, 1941 |
| 2,341,476 | Parra et al. | Feb. 8, 1944 |
| 2,346,189 | Schmidt | Apr. 11, 1944 |